(12) United States Patent
Fells et al.

(10) Patent No.: US 6,519,390 B2
(45) Date of Patent: Feb. 11, 2003

(54) CHIRPED BRAGG GRATING REFLECTORS AND ADJUSTABLE DISPERSION APPARATUS INCORPORATING SUCH GRATINGS

(75) Inventors: Julian A. Fells, Epping (GB); Richard Epworth, Herts (GB)

(73) Assignee: Nortel Networks Limited, Montreal (CA)

( * ) Notice: Subject to any disclaimer, the term of this patent is extended or adjusted under 35 U.S.C. 154(b) by 79 days.

(21) Appl. No.: 09/731,399

(22) Filed: Dec. 6, 2000

(65) Prior Publication Data

US 2002/0094164 A1 Jul. 18, 2002

(51) Int. Cl.⁷ .................................. G02B 6/34
(52) U.S. Cl. ........................... 385/37; 385/10
(58) Field of Search ..................... 385/10, 37

(56) References Cited

U.S. PATENT DOCUMENTS

| 6,169,829 B1 | * | 1/2001 | Laming et al. | ................ 385/37 |
| 6,363,187 B1 | * | 3/2002 | Fells et al. | ..................... 385/37 |
| 6,381,388 B1 | * | 4/2002 | Epworth et al. | .............. 385/37 |
| 6,400,868 B1 | * | 6/2002 | Riant et al. | ..................... 385/37 |

FOREIGN PATENT DOCUMENTS

EP         0 886 153 A       12/1998

OTHER PUBLICATIONS

Williams JAR et al: "The Design of in–fiber Bragg Grating Systems for Cubic and Quadratic Dispersion Compensation" Optics Communications, North Holland Publishing Co. Amsterdam, NL, vol. 116, No. 1, Apr. 15, 1995, pp. 62–66, XP004013254.

Feng, "Dynamic Dispersion Compensation in a 10–Gb/s Optical System Using Voltage Tuned Nonlinearly Chirped Fiber Bragg Grating", IEEE Photonics Technology Letters, vol. 11, No. 3, Mar. 1999, pp. 373–375.

Fells, Twin Fibre Grating Adjustable Dispersion Compensator for 40 GBIT/S, ECOC 2000, Mumich, 9/3–7/00.

* cited by examiner

Primary Examiner—Hung Xuan Dang
Assistant Examiner—Jack Dinh (57) ABSTRACT

Conventional quadratically chirped fiber Bragg gratings are typically apodized at both their high and low chirp ends. The present specification describes an improved Bragg grating reflector in which a second quadratically chirped region is arranged in front on the high chirp end of a substantially conventional quadratically chirped portion. The high chirp end of the first portion is not apodized; instead this apodization takes place in the second portion, and so enables the first portion to exhibit appreciable reflectivity to signals having wavelengths extending to the Bragg wavelength corresponding to the high chirp end of the first portion. The present invention thus enables the useable bandwidth of a quadratically chirped grating to be increased, and so enables an increased tuning range to be achieved in adjustable dispersion (and adjustable dispersion compensation) apparatus incorporating such gratings.

46 Claims, 8 Drawing Sheets

CHIRPED BRAGG GRATING REFLECTORS AND ADJUSTABLE DISPERSION APPARATUS INCORPORATING SUCH GRATINGS

FIELD OF THE INVENTION

The present invention relates to chirped Bragg grating reflectors, in particular to quadratically chirped Bragg grating reflectors, and to adjustable dispersion apparatus and devices (e.g. nodes and repeater units for optical transmission networks) incorporating such reflectors. The apparatus and devices may be for compensating chromatic dispersion in optical transmission systems, in particular, although not exclusively, wavelength division multiplexed digital transmission systems.

BACKGROUND OF THE INVENTION

Chromatic dispersion in optical transmission systems is the variation of group delay as a function of wavelength.

Linear (first order) dispersion, D, is the measure of the rate of change of group delay, $\tau$, with wavelength, $\lambda$. ($D=d\tau/d\lambda$.) Linear dispersion is typically measured in picoseconds per nanometer (ps/nm). In the case of a transmission medium, for instance an optical fibre waveguide, whose waveguiding properties are uniform along its length, the linear dispersion exhibited by the medium is proportional to its length and so, for such a medium, it is convenient to define its linear dispersion per unit length, also known as its linear dispersion power. This is typically measured in picoseconds per nanometer per kilometer (ps/nm/km).

The value of the linear dispersion of a transmission path is generally itself a function of wavelength, and so there is a quadratic (second order) dispersion term, Q, also known as dispersion slope, which is a measure of the rate of change of linear dispersion with wavelength. ($Q=D/d\lambda=d^2\tau/d\lambda^2$.) This is typically measured in picoseconds per nanometer squared (ps/nm$^2$). In some, but not all instances, the effects of quadratic dispersion in NDS and DC fibre (non dispersion shifted fibre, and dispersion compensating fibre) are small enough not to assume significance. There are also higher dispersion terms, whose effects generally assume even less significance.

In a digital transmission system the presence of dispersion leads to pulse broadening, and hence to a curtailment of system reach before some form of pulse regeneration becomes necessary. The problem presented by dispersion increases rapidly with increasing bit rate. This is because, on the one hand, increasing the bit rate produces increased spectral broadening of the pulses, and hence increased dispersion mediated pulse broadening; while on the other hand, increasing the bit rate also produces a reduction in the time interval between consecutive bits. In a WDM (wavelength division multiplexed) digital transmission system, it is not practical to minimize the problems of dispersion by choosing to employ a transmission medium exhibiting near-zero first order dispersive power because low first order dispersive power is associated with aggravated non-linear (e.g. four-wave mixing) distortion.

A known solution to this problem is to employ 'managed dispersion' in which near-zero aggregate linear dispersion over a particular transmission path is achieved by the use of alternating sections respectively exhibiting positive linear dispersion and negative linear dispersion, for instance by the use of NDS (non-dispersion-shifted) and DC (dispersion-compensated) optical fibre waveguide. In other words to reduce non-linear distortion resulting from interaction between pulses of different wavelengths travelling in the same direction down a fibre, it is desirable to use a dispersive fibre to reduce the phase matching of different wavelength channels and then at the end of the fibre to compensate for the dispersion introduced by the fibre, i.e. deliberately introduce dispersion having the opposite sign.

Having regard to the manufacturing tolerances in practice encountered in the fabrication of NDS and DC fibre, achieving adequately low aggregate linear dispersion becomes increasingly difficult as the bit rate is increased. Consider for instance a 40 Gbit/s WDM transmission system with a reach of 400 km, and with the shortest and longest wavelength channels separated by 200 nm. The actual amount of linear dispersion in any particular channel that can be tolerated will of course be dependent upon a number of system parameters, but typically may lie in the region of 100 ps/nm. A typical NDS fibre exhibits, at a wavelength of 1550 nm, a linear dispersive power of approximately 17 ps/(nm/km), and a quadratic dispersive power of approximately 0.058 ps/(nm$^2$·km). Recently DC fibre has been fabricated to a tolerance of ±3% in respect of linear dispersive power, and a tolerance of ±20% in respect of quadratic dispersive power. Therefore, for the 400 km span length, the uncertainty in linear dispersion compensation at the 1550 nm wavelength will amount to approximately 400 ps/nm ($\approx$400× 17×0.06 ps/nm). Given the 200 nm wavelength range, the additional uncertainty at the wavelength extremities produced by the ±20% quadratic tolerance amounts approximately to a further 900 ps/nm (400×0.058×200×0.2 ps/nm). To this must be added any uncertainty arising from any imprecision in the knowledge of the length and dispersion of the transmission fibre.

The foregoing indicates that, even if the DC fibre were manufactured to tolerances tightened by an order of magnitude, those tolerances would still be large enough to cause difficulty in achieving an accurate enough compensation for the reliable provision of an operating point near the centre of the 100 ps/nm window.

There is therefore a useful role for an adjustable amplitude linear dispersion compensation device. Such a device could be one designed for operation on its own to achieve the totality of dispersion compensation. Alternatively, it could be one designed for operation in association with a fixed amplitude dispersion compensation device, such as a length of DC fibre, that provides a level of compensation that is inadequately matched on its own. The adjustable device may be operated with some Corn of feedback control loop to provide active compensation that can respond to dynamic changes of dispersion within the system, and in suitable circumstances to step changes resulting from re-routing occasioned for instance by a partial failure of the system such as a transmission fibre break.

The compensation for linear dispersion already present across an optical signal bandwidth is not the only role for an adjustable dispersion device. There are numerous other roles for apparatus (e.g. a device) which can provide adjustable dispersion (which may not be linear) across an optical signal bandwidth. For example, it may be desirable in certain applications or experimental arrangements to introduce dispersion where none was previously present.

One way of providing dispersion which may be used for dispersion compensation (or other) purposes, utilizes spectrally distributed reflection of light produced by a chirped Bragg grating (described below) extending in the axial direction of an optical waveguide (e.g. reflection from a chirped fibre Bragg grating). Such a method is for instance described in U.S. Pat. No. 4,951,939.

Fibre Bragg gratings (FBGs) are well known and comprise a length of optical fibre (typically monomode fibre) having a refractive index n which is modulated in a periodic fashion along the length. Various techniques are used to produce the modulation $\Delta n$, and the maximum value of $\Delta n/n$ is typically in the range $10^{-6}$ to $10^{-3}$. By way of analogy with conventional "line" gratings, the fibre Bragg grating can be thought of as as series of grating elements, each one being a region of modified refractive index, along an optical fibre. In reality, the "edges" of the grating elements are not precisely defined, and in a FBG having constant pitch the refractive index may simply vary in a sinusoidal manner along the fibre.

Other forms of Bragg grating reflectors are also known, such as planar waveguide gratings. In these structures, the refractive index is modulated in some way along an optical path to provide the grating elements.

The pitch of the Bragg grating reflector is the separation between adjacent peaks or troughs in the variation of refractive index along the optical path (i.e. the pitch is the spacing of the grating "elements"). In the case of FBGS, the pitch is the spacing of the grating elements along the fibre's length.

The physical pitch $\Lambda$ of the grating is related to the Bragg wavelength $\lambda$ by equation (9) below, and hence an important quantity is the effective pitch of the grating, which is the product of the refractive index and the physical pitch, i.e. $n.\Lambda$.

If the effective pitch of the grating is uniform along its length then the grating will not impart any dispersion to incident light; it will simply reflect light at the Bragg wavelength determined by that effective pitch.

However, it the effective pitch varies along the grating's length, different wavelengths of incident light will, in effect, be reflected from different positions, and hence travel different distances along the optical path. Thus, a Bragg reflection grating with non uniform effective pitch can impart dispersion to optical signals because it presents a delay which is a function of wavelength.

"Chirped" is the term used to describe a Bragg reflection grating in which effective pitch varies in a predetermined manner along its length (i.e. along the optical path).

A linearly chirped grating is one in which effective pitch varies substantially as a linear function of position, z, along the optical path, and results in a substantially linear variation of delay with wavelength over a bandwidth determined by the Bragg wavelengths corresponding to the effective pitches at the beginning and end of the grating.

As mentioned above, it is desirable to provide adjustable dispersion. If a linearly chirped FBG is stretched uniformly (e.g. by applying tensile stress to produce uniform strain along its length) both its effective pitch and the rate of change of effective pitch with position (which remains uniform along the FBG's length) are altered.

For a fractional extension, a, of the FBG, the linear dispersion changes by the same fraction. The practical constraints on the strain which may safely be applied to a fibre without risk of fractures, however, mean that only negligible changes in linear dispersion may be achieved by straining linearly chirped gratings, these changes being too small to be useful in most applications.

In addition to linearly chirped gratings, quadratically chirped Bragg grating reflectors are also known. These may be used to provide dispersion having a fixed variation across a bandwidth, or may incorporated in apparatus/devices where they are stretched to provide a useful range of adjustable linear dispersion.

A quadratically chirped grating is a grating whose effective pitch is arranged to vary with position z in such a manner so as provide a delay which substantially satisfied the relationship:

$$\tau(\lambda) = a_0 + a_1\lambda + a_2\lambda^2 \qquad (1)$$

It will be apparent that a desired chirp profile may be obtained by varying the physical pitch or the refractive index of the grating "elements" along the grating, or by a combination of these two techniques. A variation in refractive index may, for example, be achieved by arranging for there to be a temperature variation along the grating. A suitable variation in refractive index could also be achieved by changing the bulk index, for example by exposing the grating to a continuous UV beam (i.e. a second exposure, with no phase mask). It will also be apparent that (changes in chirp profile may be brought about by straining of the grating (to bring about changes in physical pitch (which may be non-uniform)) and/or by altering the temperature profile along the grating (to change the refractive index).

To a first approximation, the form of delay given in equation (1) may be provided by a grating whose physical pitch is also a perfect quadratic function of position (i.e. a function having only a zero offset, a component proportional to z, and a component proportional to $z^2$). However, a particular wavelength of light is not "reflected" from a single point along the grating; it is reflected as a result of interaction with a distributed region of the grating, and the length of that region increases with increasing $\lambda$.

Accordingly, a "perfect" quadratic variation of pitch with z does not give an exact quadratic variation of delay with $\lambda$. If a near-perfect quadratic delay variation is required, computational techniques can be used to determine the requisite dependence of pitch on position, a dependence which will deviate from the perfect quadratic.

In this specification, the term "substantially quadratic" will therefore be used to include perfect or near-perfect quadratic variation, along with the form of delay variation resulting from a near-perfect quadratic effective pitch variation, and the form of pitch variation required to give near-perfect quadratic delay variation.

The term "pitch" is intended to encompass "effective pitch" where context permits.

Similarly, the term "quadratic" should be interpreted as encompassing "substantially quadratic" where context permits.

The following analysis is provided to assist the reader in understanding the background to the invention and to introduce some of the terms and variables used later in the description.

Starting with a grating arranged to provide a display which satisfies equation (1), the linear dispersion is given by:

$$D(\lambda) = \frac{d\tau}{d\lambda} = a_1 + 2a_2\lambda \qquad (2)$$

and the quadratic dispersion by:

$$Q(\lambda) = \frac{dD}{d\lambda} = \frac{d^2\tau}{d\lambda^2} = 2a_2 \qquad (3)$$

Equation (3) shows that, because the differential group delay contains no cubic or higher order term, the quadratic dispersion, Q, is actually a constant, $2a_2$, rather than a term functionally dependent upon wavelength, $\lambda$.) Equation (1) may with advantage be rewritten in terms of the zero offset delay $\tau_0$, the linear dispersion $D_0$, and quadratic dispersion $Q_0$ values ($Q_0$=Q) pertaining to some chosen baseline wavelength $\lambda_0$. This baseline wavelength $\lambda_0$ is typically a wavelength at one end of (or in the middle of) the wavelength range over which dispersion compensation is required. Such a rewriting gives:

$$\tau(\lambda) = \left(\tau_0 - D_0\lambda_0 + \frac{Q_0}{2}\cdot\lambda_0^2\right) + (D_0 - Q_0\lambda_0)\lambda + \frac{Q_0}{2}\cdot\lambda^2 \qquad (4)$$

Under the assumption that each wavelength component $\lambda$ of the incident light is effectively reflected at some specific distance $z(\lambda)$ along the length of the grating, the delay $\tau(\lambda)$ is therefore the folded physical path length (2z) divided by the propagation speed of light in the waveguide (c/n), where C is the in vacuum speed of light. Hence:

$$\tau(\lambda) = \frac{2n}{c}\cdot z(\lambda) \qquad (5)$$

Substituting equation (5) in equation (4) together with:

$$\Delta\lambda = \lambda - \lambda_0 \qquad (6)$$

gives;

$$\tau(\lambda) = \frac{2n}{c}\cdot z(\lambda) = \tau_0 + D_0\cdot\Delta\lambda + \frac{Q_0}{2}\cdot\Delta\lambda^2 \qquad (7)$$

Equation (7) is a quadratic equation in $\Delta\lambda$ whose solution, under the condition that z=0 at $\tau_0$=0, is given by;

$$\Delta\lambda = \frac{-D_0 \pm \sqrt{D_0^2 + \frac{4Q_0 n}{c}\cdot z}}{Q_0} \qquad (8)$$

where $\Delta\lambda$ is the change in Bragg wavelength as a function of distance z along the grating.

The optimum value of $Q_o$ depends on the optical bandwidth and the grating length. Whilst increasing $Q_o$ results in a greater dispersion charge per unit wavelength separation, it also results in smaller bandwidth gratings, so less separation can be achieved.

Remembering that the physical pitch, $\Lambda$, of the grating, is related to the Bragg wavelength $\lambda$ by;

$$\lambda = 2n\cdot\Lambda \qquad (9)$$

equation (8) also provides a description of the pitch variation of the grating. Differentiating equation (7) with respect to $\lambda$, and rearranging, gives:

$$D(\lambda) = D_0 + Q_0\cdot\Delta\lambda \qquad (10)$$

Accordingly, ignoring the bandwidth limiting effects produced by apodisation of the grating (which is discussed below), a linear dispersion range $\Delta D = D_1 - D_0$ requires a bandwidth:

$$B = \lambda_1 - \lambda_0 = \frac{\Delta D}{Q_0} \qquad (11)$$

Substituting equation (11) in equation (7) to find the grating length, $\Delta z$, gives:

$$\Delta z = \frac{c}{4nQ_0}(2D_0 - \Delta D + \Delta D^2) \qquad (12)$$

Equation (12) defines the length of a grating that is required to meet a given design specification.

Implicit in the foregoing analysis is the assumption that quadratic chirp of a Bragg reflection grating produces an equivalent quadratic component of group delay. As discussed above this is not an exact relationship, but it is a close approximation.

Figure 1:
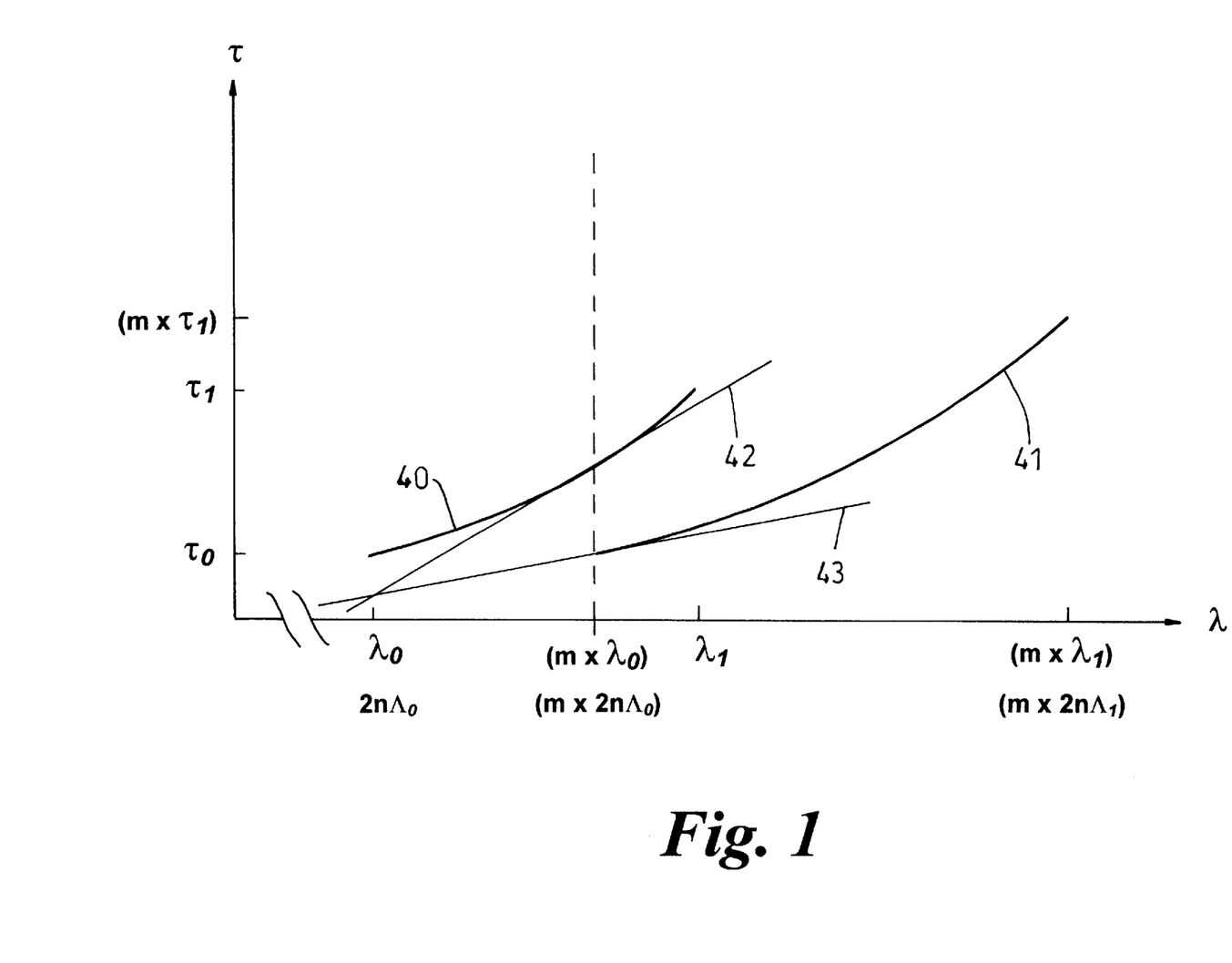
FIG. 1 is a diagram illustrating the charge in the delay characteristic of a quadratically chirped grating resulting from uniform stretching.

Thus, a quadratically chirped grating exhibits a linear dispersion which varies over a reflectance bandwidth. FIG. 1 shows how the stretching of a single quadratically chirped grating can be used to adjust the linear dispersion provided to signals in a bandwidth S centred on a wavelength $m\lambda_o$.

In the unstretched condition, the way the differential group delay, $\tau$, varies as a function of Bragg reflection wavelength, $\lambda$, is represented by trace 40. In this condition, the FBG will reflect wavelengths from $\lambda_0$ to $\lambda_1$ (ignoring, for the moment, apodisation effects). If that portion of the fibre extending between the first and last grating elements of the fibre is now stretched by an extension factor 'm', where $\lambda_0 < (m \times \lambda_0) < \lambda_1$, the delay to the beginning of the grating remains unchanged at $\tau_0$, and now the way the differential group delay, $\tau$, varies as a function of Bragg reflection wavelength, $\lambda$, is represented by trace 41. The grating pitch at this end is however expanded by the extension factor 'm' from $\Lambda_0$ (where $\Lambda_0 = \lambda_0/2n$) to $m \times \Lambda_0$. Accordingly trace 41 is an m-fold expanded replica of trace 40, with its commencement point shifted in the direction of the $\lambda$ axis from the point with the co-ordinates ($\lambda_0$, $\tau_0$) to that with the coordinates ($m\lambda_0$, $\tau_0$). Light of wavelength $m\lambda_0$ is reflected in the fibre at the point at which the grating pitch is $2n \times m\Lambda_0$. The linear dispersion, $d\lambda/d\tau$, at this wavelength is given by the gradient of the differential group delay characteristic at this wavelength. In the case of the unstretched fibre, this is the gradient of the line 42 which is tangential to trace 40 at $\lambda = m\lambda_0$. In the case of the stretched fibre, this is the gradient of the line 43 which is tangential to trace 41 at $\lambda = m\lambda_0$. It is thus seen that the effect of the stretching has been to reduce the magnitude of the linear dispersion at $m\lambda_0$.

The uniform stretching of an optical waveguide possessing a chirped Bragg grating with a quadratic, component of its chirp to induce a change in the linear dispersion afforded by the structure is disclosed by K -M Feng et al. in, 'Dynamic Dispersion in a 10-Gbit/s Optical System Using a Novel Voltage Tuned Nonlinearly Chirped Fiber Bragg Grating', IEES Photonics Technology Letters, Vol. 11, No. 3, pp 373–5.

From FIG. 1 it can be seen that if the signal bandwidth S is small compared with the reflectance bandwidth of the quadratically chirped grating, then the variation in linear dispersion over the signal bandwidth may be negligible. Straining of the single grating can thus be used to provide adjustable linear dispersion in the signal bandwidth. If the signal bandwidth S is a substantial fraction of the single grating reflectance bandwidth, however, the variation in linear dispersion across S may be considerable, and intolerable for certain applications. There is, therefore a role for devices providing near-uniform adjustable linear dispersion across wider signal bandwidths.

Figure 2A:
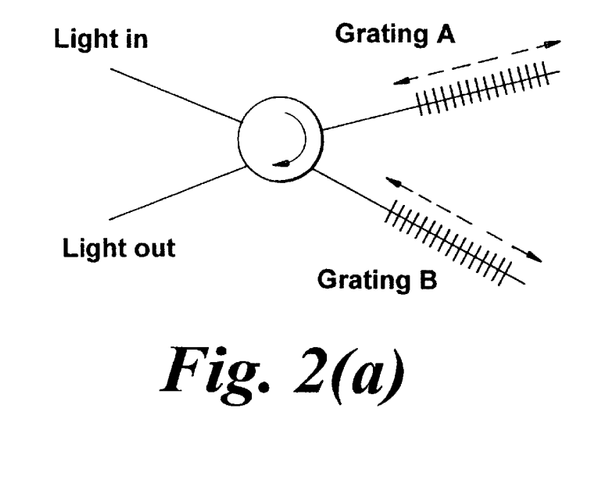
FIG. 2a is a schematic diagram of a known adjustable linear dispersion compensating device.
Figure 2B:
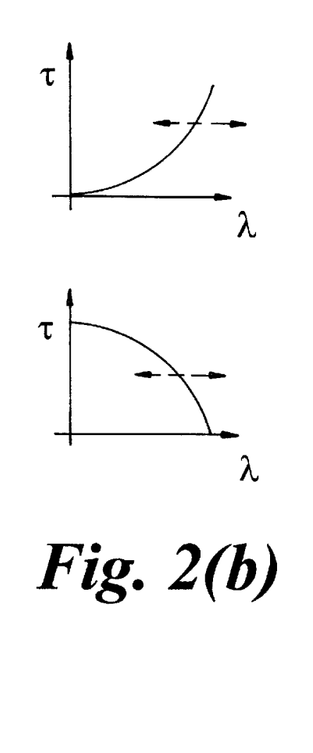

Such a device is disclosed in "Twin fiber grating adjustable dispersion compensator for 40 Gbit/s", J. A. J. Fells et al, Post-deadline paper 2.4, ECOC 2000, Munich, Sep. 3–7, 2000, and similar devices (and a corresponding adjustable dispersion compensation method) are described and claimed in the specification of U.S. Pat. No. 6,381,388 filed Sep. 1, 2000, which is assigned to a common assignee, and the contents of which are incorporated herein by reference. The device disclosed in the above-referenced paper utilises two "opposing" quadratically chirped gratings used differently to cancel out higher order dispersion (HOD), i.e. quadratic dispersion. The device consists of a four-port circulator and two quadratically chirped FBGs arranged to provide quadratic group delays equal to magnitude but of opposite sign, as shown in FIG. 2a. Light input to the device is first reflected by grating A, and then by grating B, before emerging from the device. Thus, the delay imported to incident light, on a function of wavelength, is a combination of the two opposite quadratic delays of the respective gratings (shown in FIG. 2b).

A variable linear strain is applied to each grating independently, by means of piezo-electric transducers in the described device, but other means will be apparent to the person skilled in this art. Initially, the gratings are arranged such that their reflectance bandwidths overlap to the fullest extent possible (i.e. so that they spectrally coincide). Preferably, the two gratings are nominally identical, with grating B simply being reversed so that light to be reflected is incident to the two gratings from opposite directions. If the two gratings are nominally identical, then full spectral overlap is ensured provided both gratings are stretched by the same amount. Preferably, a common tension is applied to the two gratings initially, so that differential strain may then be applied to adjust the dispersion resulting from the combined delays.

If the two gratings are nominally identical and their reflectance bandwidths perfectly overlap (i.e. coincide) their combined effect is to provide a flat delay characteristic. By applying differential strain, for example by increasing the tension in grating A whilst simultaneously decreasing the tension in grating B by a corresponding amount, negative linear dispersion can be obtained in the region where the reflectance bandwidths overlap. Similarly, positive linear dispersion can be obtained by relative straining of the two gratings in the opposite direction.

Figure 2C:
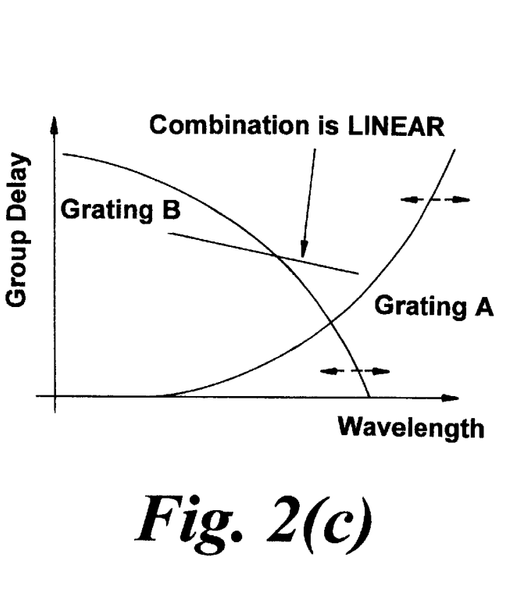

Thus, although the dispersion introduced by each grating in quadratic, their combined effect is to provide linear dispersion in the range of overlap of their reflectance bandwidths, linear dispersion whose slope is dependent on the degree of overlap between the two reflectance bandwidths, and which can be varied from zero (corresponding to full overlap) in either the positive or negative direction (see FIG. 2c).

A device of the above-described type, comprising two nominally identical FBGs each of nominal reflectance bandwidth $B_R$, gives a linear dispersion tuning range $$T=2Q_o(B_R-S) \quad (13)$$

Where the factor of 2 comes from the fact that the relative strain of the two gratings may be in either direction.

Similarly, for a single grating, the linear dispersion tuning range is $$T=Q_o(B_R-S) \quad (14)$$

In practice, the reflectance bandwidth $B_R$ of a grating is not as large as the bandwidth B simply defined by, the grating pitch at the beginning and end of the grating. It is essential to "apodise" the grating, which has the effect of reducing the reflectance bandwidth and hence the tuning range.

"Apodisation", literally meaning the removal of feet, is a well known term of art which means the gradual reduction, down to zero (or near zero), of the coupling coefficient Kappa at the grating edges (i.e. ends).

Coupling coefficient is a measure of how strongly the grating at a particular position can reflect incident light having the corresponding Bragg wavelength, and is given by the expression:

$$\kappa = \frac{\pi \cdot \Delta n}{2\lambda_b} \quad (15)$$

where $\Delta n$ is the local modulation of refractive index and $\lambda_b$ is the local Bragg wavelength defined by the local pitch. Thus, the apodisation of the grating means that wavelengths at the end of the bandwidth B for which Kappa is below a certain threshold will not be substantially reflected, and hence $B_R$ is smaller than B.

Although this reduction in "usable" grating bandwidth (and the resultant decrease is available tuning range) is undesirable, apodisation of the grating is essential in order to remove sidelobes and more importantly to remove, or at least reduce, delay ripple.

"Sidelobes" are reflections at wavelengths outside the nominal reflectance bandwidth of the grating and are undesirable because they may fall, for example, in the bandwidth of a neighbouring channel in WDM systems, causing interference.

Delay ripple is the term used to denote the variation in actual group delay from (the desired) perfect quadratic function of wavelength, Delay ripple is undesirable because if its magnitude is sufficiently large, signal distortion may result from reflection by the grating and information may be lost. Thus, delay ripple is a problem even in single channel systems.

Figure 3:
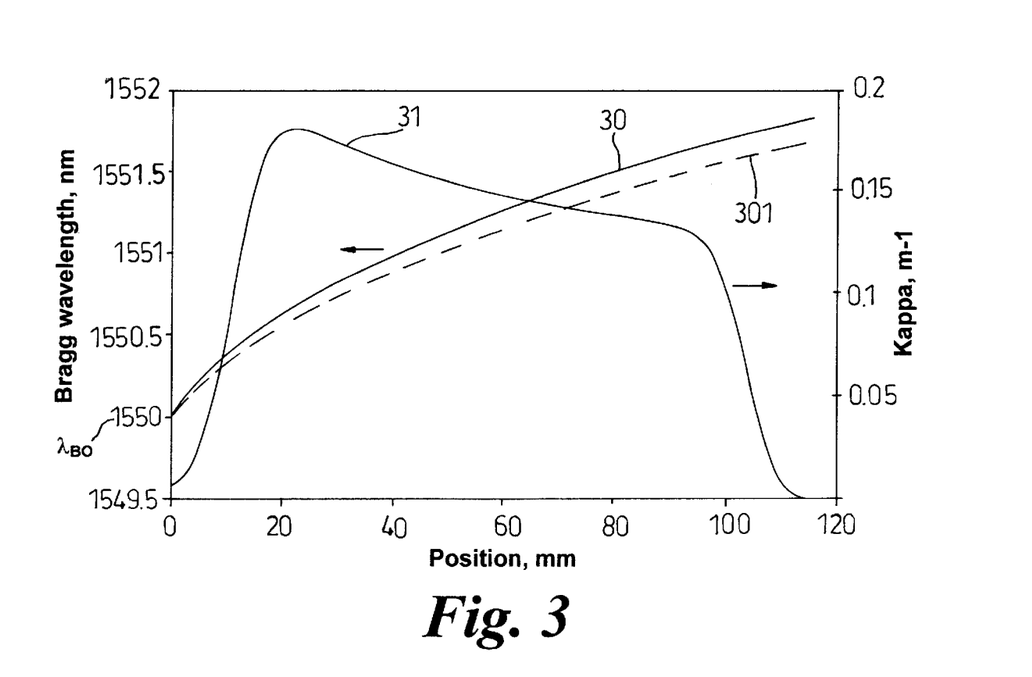
FIG. 3 is a plot of Bragg wavelength and coupling coefficient, Kappa, for a known quadratically chirped fibre Bragg grating.

FIG. 3 shows the chirp profile and variation of coupling coefficient with position along a known quadratically chirped FBG.

The chirp profile 30 is shown as a variation in Bragg wavelength along the length of the fibre Bragg grating, resulting from a changing grating pitch. At position Z=0 (the first end of the grating) the Bragg wavelength is $\lambda_{BD}$ which is approximately 1550 nm. The Bragg wavelength then increases with distance along the fibre up to a maximum at the second end. The relationship between Bragg wavelength and position Z is quadratic, and obeys Eqn. (8).

The broken line 301 on FIG. 3 corresponds to the chirp profile which would result if just the quadratic term were altered. Broke line 301 corresponds to the situation where $Q_o$ has been increased. As can be seen, this results in a reduction in the grating bandwidth (the Bragg wavelength at the second end of the grating for broken line 301 is lower than the corresponding Bragg wavelength on the original profile 30). The first end of the grating (i.e. the end at Z=0) is the "high chirp" end, as it is here that the rate of change of Bragg wavelength with position is the highest.

In the conventional design of quadratically chirped grating, as shown in FIG. 3, the parameters which determine the tuning range are the grating length (mm), the dispersion at the start of the grating, $D_0$ (ps/nm) and the dispersion slope, $Q_0$ (ps/nm$^2$). There is an optimum value of Q, depending on the grating length, which is generally around 500 ps/nm2. As mentioned above, if the value of $Q_0$ is increased, the bandwidth of the grating is decreased. The length of the grating is limited by the size of the phase mask and the size of the mechanical actuator. This length is therefore limited to 115 mm, but in fact there is only marginal tuning range to be gained by extending this value (in particular, because of the quadratic variation of Bragg wavelength with position, extending the low chirp end of the grating "buys" less and less bandwidth—there is a diminishing return). With regard to the high chirp end of the grating, it is desirable to minimise $D_0$ as much as possible (i.e. to make the rate of change of Bragg wavelength with position at the high chirp end as large as possible) as this gives more bandwidth and hence tuning range. However, it is not practical to reduce then value of $D_0$ much below 150 ps/nm, as very high chirps (i.e. high rates of change of Bragg wavelength with position) require high coupling coefficients (which are difficult to achieve) and high chirps are also more prone to quantisation errors on the phase mask. Thus, the chirp at the high chirp end of the grating is usually arranged to be a maximum, taking into account the practical constraints regarding grating fabrication, and so no further extension of the quadratic Bragg wavelength versus position characteristic at this end can be made.

A usual aim is to maxixmise the bandwidth of the grating as much as possible whilst maintaining a quadratic group delay. As mentioned above, grating bandwidth B directly contributes to tuning range T=2Q (B–S), where T is the dispersion tuning range and S is the signal bandwidth. Since the signal bandwidth S is a substantial portion of the grating bandwidth in certain applications, even a slight increase in B can give a large increase in tuning range. For the optimum with Q=500 ps/nm2, every 0.1 nm increase in bandwidth per grating adds 100 ps/nm to the total tuning range. However, a necessary feature of a practical Bragg grating is to have apodisation at the grating edges to remove sidelobes, but more importantly delay ripply, as discussed above. This requires a smooth transition in the coupling coefficient, Kappa, down to near zero at the edges. This is shown as the curve 31 in FIG. 3. As can be seen, the coupling coefficient decays away at the edges of the grating, but has a substantial value over a central portion of the grating. This is the portion which provides substantial reflection of the appropriate Bragg wavelengths. The coupling coefficient has a deliberately introduced variation over the central reflecting portion in order to compensate for the facts that rather than being reflected from a single point (i.e. position) along the grating length, different wavelengths are reflected as a result of interactions with distributed regions of the grating, the length of these regions itself being a function of wavelength. Thus, low chirp portions reflect light by interaction with a longer length of the grating than high chirp portions, and the variation in coupling coefficient along the reflecting portion, as shown in FIG. 3, is arranged so that the resultant variation of reflectivity with wavelength has a substantially flat top.

The apodisation shown in FIG. 3 results in the effective length of the grating being reduced, such that the useable part of the grating is where the Kappa is large enough to give reasonable reflectivity. A direct result of the apodisation is that by the time the Kappa is high enough to provide good reflectivity at the start of the grating, the dispersion has increased to maybe 400 ps/nm. The nature of the quadratic chirp means that the majority of the bandwidth is actually at the start of the grating where the chirp is highest (high chirp=large bandwidth). Thus, the conventional design means that a very large fraction of the bandwidth is lost at the start of the grating in the apodisation region. Inspection of FIG. 3 shows that by the time the Kappa has reached a peak of 0.18 m 1 at a position of 22.5 mm, a bandwidth of 0.65 nm, or 650 s/nm tuning has been lost. This is a very large loss when considering that the device has only a 500 ps/nm tuning range as a result.

Figure 4:
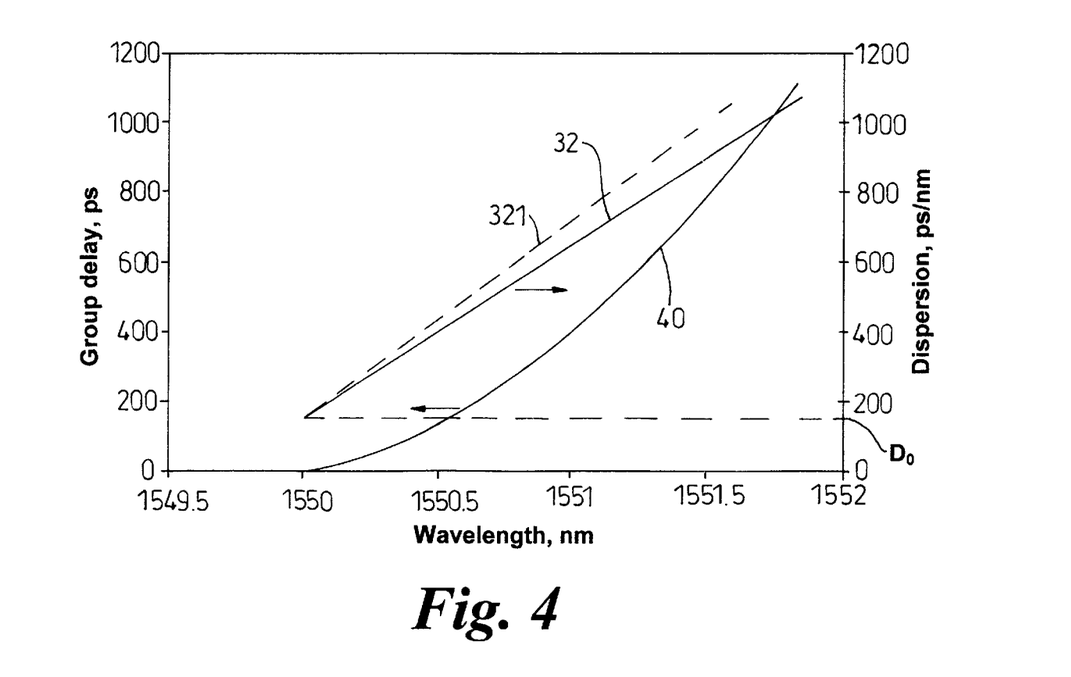
FIG. 4 is a plot of dispersion and group delay as functions of wavelength for the quadratically chirped fibre Bragg grating whose characteristics are shown in FIG. 3.

FIG. 4 shows the variation in group delay and linear dispersion D resulting from the Bragg wavelength profile 30 shown in FIG. 3. The variation of group delay with wavelength is shown as line 40, and the variation of linear dispersion, starting from $D_O$ is shown as line 32. Broken line 321 shows the variation in linear dispersion with wavelength resulting from the Bragg wavelength variation shown as the broken line 301 in FIG. 3, i.e. the dispersion variation resulting from an increase in Q.

Thus, apodisation of Bragg grating reflectors is necessary, but reduces the "useable" bandwidth and so reduces the tuning range of adjustable dispersion devices incorporating such gratings.

It is not possible to extend the high chirp end of such gratings, as this is typically already at a maximum chirp, constrained by fabrication practicalities. Extending the low chirp end can increase the tuning range, but only very marginally and at a high penalty in terms of increasing the physical size of the grating and the size of the phase mask. If the grating is to be strained, this increase in size also means that the size of the strain actuator must be increased, Furthermore, good quality long fibre Bragg reflection gratings are difficult to fabricate in optical waveguides because they are typically written in the guide sequentially, section by section, in short sections that need to be critically positioned with respect to each other to avoid excessive stitch error meditated quality degradation.

It would, therefore, clearly be desirable to increase the useable bandwidth of a quadratically chirped grating, without necessitating a large increase in its length.

It would be particularly desirable to be able to utilise the bandwidth at the high chirp end of a quadratically chirped Bragg grating reflector, which has previously been lost as a result of the necessary apodisation.

There is also an ongoing need for apparatus and devices which can provide adjustable dispersion over larger and larger tuning ranges, which can importantly allow a considerable loosening of the tolerances on matching the dispersions in optical transmission systems.

SUMMARY OF THE INVENTION

One aim of the present invention is to provide a quadratically chirped Bragg grating reflector hating an increased reflectance (i.e. useful) bandwidth, whilst still presenting a delay characteristic having acceptably low ripple. A further aim of the present invention is to provide Bragg grating reflectors having regions of quadratic chirp and reflection bandwidths which extend to the Bragg wavelengths at the high chirp ends. The present invention also aims to provide adjustable dispersion apparatus incorporating such gratings, apparatus which can provide increased tuning ranges compared with previous apparatus and/or increased optical bandwidth.

According to a first aspect of the present invention, there is provided a Bragg grating reflector comprising:

a quadratically chirped first portion having a high chirp end and a low chirp end; and a differently chirped second portion arranged in series with the first portion, the second portion having a first end proximate the high chirp end of the first portion, and a second end, wherein the high chirp end of the first portion is not apodised, and the chirped second portion is apodised to at least reduce delay ripple for light signals in a bandwidth reflected by the grating.

The first and second portions are differently chirped i.e. the chirp of the second portion is not simply a continuation of the quadratically varying chirp of the first portion.

The chirp is, of course, the rate of change of the effective pitch of the grating. In many embodiments the chirp will simply correspond to a rate of change of the physical pitch of the grating. However, the chirp may alternatively be achieved by suitable variation of refractive index along the grating.

The high chirp end of the first portion is not. apodised, and so can provide substantial reflection of incident light at the appropriate wavelengths. The presence of the suitably chirped second portion in series with the first portion does, however, mean that the grating as a whole exhibits a delay characteristic having acceptably low ripple.

The Bragg grating reflector may be a FBG, a planar waveguide grating, or a grating formed in some other optical waveguide structure.

Preferably, the chirp of the second portion does not exceed the chirp at the high chirp end of the first portion.

Advantageously, the chirp at the first end of the second portion is equal to the chirp at the high chirp end of the first portion.

Advantageously, the first end of the second portion is immediately next to the high chirp end of the first portion.

Preferably, the chirp of the grating is a continuous function of position from the low chirp end of the first portion to the second end of the second portion.

Preferably the second portion is quadratically chirped, with the chirp at its first end being higher than the chirp at its second end. This can provide a substantially rectangular, i.e. substantially symmetrical, reflectance characteristic around the centre wavelength of the first quadratically chirped portion.

However, a quadratically chirped second portion is not essential. For example, the second portion may be linearly chirped and can still enable the high chirp end of the first portion to be used for reflection whilst providing reduced delay ripple.

According to a second aspect of the present invention, there is provided a Bragg grating reflector having a length, and an effective pitch and a coupling coefficient which are each dependent on position along the length, the grating comprising first and second chirped portions arranged in series with each other along the length and each having respective first and second ends, the second end of the first portion being proximate the first end of the second portion, the effective grating pitch in the first portion being a substantially quadratic function of position and progressively increasing or decreasing from the first to the second end, and the modulus of the rate of change of effective grating pitch with position in the first portion being a maximum at the second end, wherein the effective grating pitch in the second portion is a different function of position and continues to progressively increase or decrease, respectively, from the first end to the second end, the coupling coefficient at the second end of the first portion of grating is arranged to provide substantial reflectivity to incident light of the appropriate Bragg wavelengths, and the coupling coefficient in the second portion of grating is arranged to exhibit a reflectivity to incident light of the appropriate Bragg wavelengths which decreases from a substantial value at the first end to substantially zero at the second end.

Thus, the second end of the first region (i.e. the high chirp end where the rate of change of grating pitch with position is the highest) is not apodised, and reflection from this end enables the important, large section of grating bandwidth at this end to appear in the reflectance bandwidth.

The apodisation required to remove sidelobes and to suppress delay ripple is provided by the second portion of the grating, which can be short compared with the first portion.

Thus, a major advantage of the inventive grating is that the useful bandwidth (i.e. reflectance bandwidth) of the quadratically chirped portion is increased significantly, at the highly important high chirp end, without compromising sidelobe and delay ripple suppression.

This can be achieved without increasing the grating length significantly. Indeed, the overall length of the first and second portions combined may be made equal to the length of an equivalent conventional quadratically chirped grating, whilst providing greatly increased useable bandwidth.

Again, the Bragg grating reflector may be a FBG, a planar waveguide reflector, or have some other structure.

The low chirp end of the quadratically chirped portion is not as important as the high chirp end in terms of its contribution to overall bandwidth, and so may be apodised in the same way as with conventional gratings. Alternatively, a third chirped portion may be arranged at the first end (i.e. the low chirp end) of the first portion, and the apodisation may take place in this third portion.

By the phrase "a different function of position" it is meant that the variation of effective pitch in the second portion is not simply a continuation of the same substantially quadratic variation in the first portion. The variation in the second portion may also be a quadratic function, but different from that in the first portion. For example, it may be a reverse of the quadratic function of the first portion, in which case, if the first and second portions are adjacent each other, the junction between them is at a point of inflection in the variation of effective pitch with position over the two regions.

Preferably the modulus of the rate of change of effective grating pitch with position in the second portion is a maximum at the first end, and the maximum at the first end of the second region is less than or equal to the maximum at the second end of the first region.

Preferably the pitch at the second end of the first portion is substantially equal to the pitch at the first end of the second portion, although some discontinuity is possible.

Preferably, although not necessarily, the second end of the first portion may be immediately adjacent to the first end of the second portion so that there is no other portion in between these two. There may, however, in other embodiments be an intermediate region, in which the grating pitch may, for example, be substantially constant.

When the first and second portions are immediately adjacent to one other, it is preferable that the grating pitch is a continuous function of position from the first end of the first portion to the second end of the second portion. However, this is not essential, and some discontinuity may be tolerated in certain circumstances.

The variation of grating pitch with position nay be substantially quadratic in both the first and second portions, and the variation in the second portion is, preferably, simply the "reverse" of that in the first portion. The junction $Z_0$ between the two portions is a point of inflection, at which the rate of change of Bragg wavelength with position reaches a maximum (i.e. a position at which chirp reaches a maximum).

The Bragg grating reflector grating may just consist of the first and second regions, and no other grating elements. Such a grating may be apodised at the first end of the first region and the second end of the second region.

The grating pitch in the first portion may not be an exact quadratic function of position, but may be arranged to vary in such a manner that the first portion presents a delay to incident light over a particular bandwidth, the delay being substantially an exact quadratic function of wavelength.

As mentioned above, the grating pitch in the second portion may be a substantially quadratic function of position, and that quadratic function may essentially be the reverse of the quadratic variation of pitch with position in the first portion.

Alternatively, the grating pitch in the second portion may vary in a different manner with position, and may for example by linearly chirped.

Preferably, the grating pitch and the rate of change of grating pitch with position (i.e. the chirp) at the second end of the first portion may be substantially the shame as the pitch and chirp respectively at the first end of the second portion. Thus, the grating pitch and chirp may be continuous functions across the junction of the first and second portions.

In certain preferred embodiments, the first portion of grating may be sampled to provide reflection in a plurality of wavelength bands. With such an arrangement, it is highly preferable for the second portion to be quadratically chirped, as this gives the "squarest" form of reflectance spectra for the plurality of wavelength bands. This is in turn enables the reflectance bands to be more closely spaced.

According to a third aspect of the present invention there is provided apparatus for providing dispersion to light signals in a predetermined bandwidth, the apparatus comprising a Bragg grating reflector as defined above, and an optical waveguide arranged to convey the light signals to the grating for reflection, and an optical waveguide arranged to convey the reflected light signals away from the grating.

A fourth aspect of the present invention provides apparatus for providing adjustable dispersion to light signals, the apparatus being substantially in accordance with the second aspect, but further comprising adjustable strain apparatus arranged to apply adjustable tensile strain to the Bragg grating reflector in a direction along its length to adjustably vary its pitch.

Preferably the adjustable dispersion apparatus may exhibit linear optical dispersion of adjustable magnitude, and may include first and second optical fibre waveguides provided with respective first and second chirped Bragg grating reflectors as defined above, the gratings exhibiting, in the absence of strain, quadratic chirp of substantially matched modulus, and which gratings are arranged to define an optical transmission path that includes sequential reflection in both gratings with a relative orientation to provide quadratic chirp of opposite sign. Preferably the reflectors are FBGs and the device is preferably arranged to maintain each fibre waveguide, over the length of its fibre Bragg grating, in substantially uniform tensile strain, and includes a differential mode strain adjuster operable to adjust the magnitude of the dispersion exhibited by the device by reducing the tensile strain in one of the gratings whilst increasing, by a substantially equivalent amount, the strain in the other grating.

The two gratings of the above-mentioned device may be substantially identical, the second grating simply being turned around so that the light signals are incident to it from the opposite direction to the first.

According to a further aspect of the invention, there is provided optical signal transmission apparatus comprising a plurality of repeater units for connecting a plurality of lengths of signal-conveying optical fibre, each repeater unit including apparatus as defined above for compensating for dispersion in the signals received from the preceding length of fibre. Each repeater unit may include apparatus for providing adjustable compensation for the dispersion.

According to yet another aspect of the present invention there is provided a node for an optical transmission system the node including dispersion compensation apparatus as defined above for compensating dispersion in signals received by the node.

In such a node for an optical transmission network, it is particularly desirable to have as large a range of adjustable dispersion compensation as possible, to accommodate large changes in the dispersion of the signals received by the node. These changes can result from re-routing of the signals. If a signal has to be re-routed to arrive at a given node, for example as a result of a break in one of the optical fibres, then this re-routing necessarily means that the signal is now travelling along at least some different fibres, and indeed may be travelling a different distance before arriving at the node. Each of these factors will alter the overall dispersion present in the received signal. The greater the range of adjustable dispersion compensation provided by a node, the greater the degree of re-routing that can be tolerated without degrading signal transmission performance, and hence the more flexible the network becomes as a whole.

Other features and advantages of the invention will be readily apparent from the description of preferred embodiments of the inventions from the drawings and from the claims.

BRIEF DESCRIPTION OF THE DRAWINGS

FIG. 2b is a schematic diagram of the delay characteristics of the two fibre Bragg gratings in the apparatus of FIG. 2a;

FIG. 2c is a schematic diagram of the individual and combined group delays of the gratings of the apparatus of FIG. 2a;

DETAILED DESCRIPTION OF PREFERRED EMBODIMENTS

Figure 5:
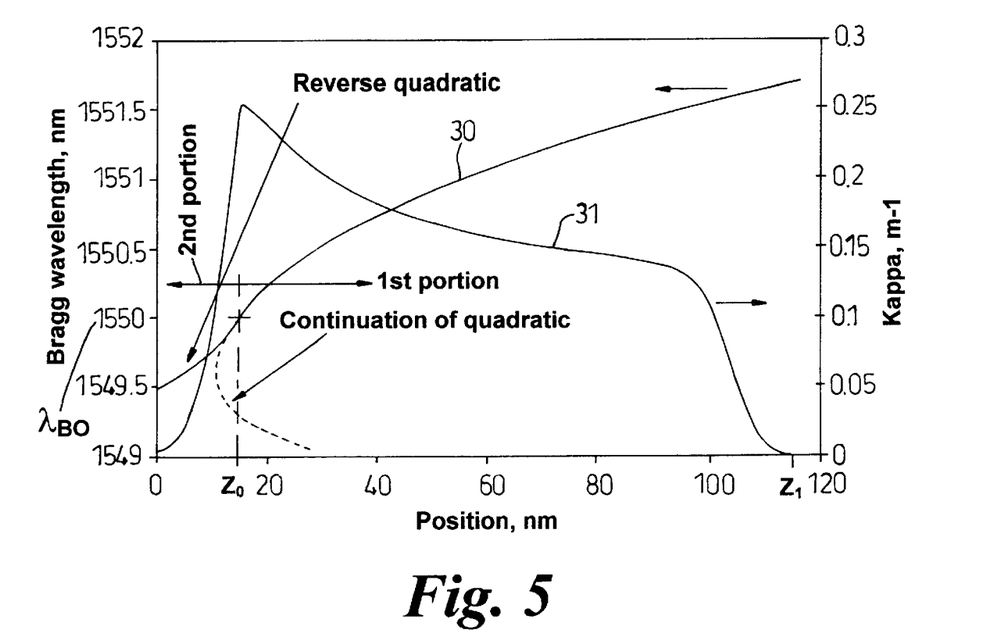
FIG. 5 is a plot of the variation of Bragg wavelength and coupling coefficient along the length of a fibre Bragg grating in accordance with an embodiment of the present invention.

FIG. 5 shows the variation in Bragg wavelength and coupling coefficient along the length of a fibre Bragg grating embodying the present invention. The fibre Bragg grating consists of a first chirped portion which has a first end at position $Z_1$ and a second end at position $Z_0$ next to the first portion is a second chirped portion, extending from a first end at $Z_0$ to a second end at the nominal Z=0 position. The grating pitch is a continuously varying function of position from Z=0 to $Z_1$. The corresponding variation of Bragg wavelength with position along the grating is shown as curve 30. The curve 30 is effectively the chirp profile of the device. The chirp profile is quadratically chirped for the first portion (the main tuning section). However, at the "start" of the grating (i.e. the second portion) where the apodisation takes place, the quadratic chirp is reversed such that it mirrors the chirp profile of the main tuning section. The variation in Bragg wavelength with position over the first and second portions substantially conforms to the relation given by Eqn. (8).

Figure 6:
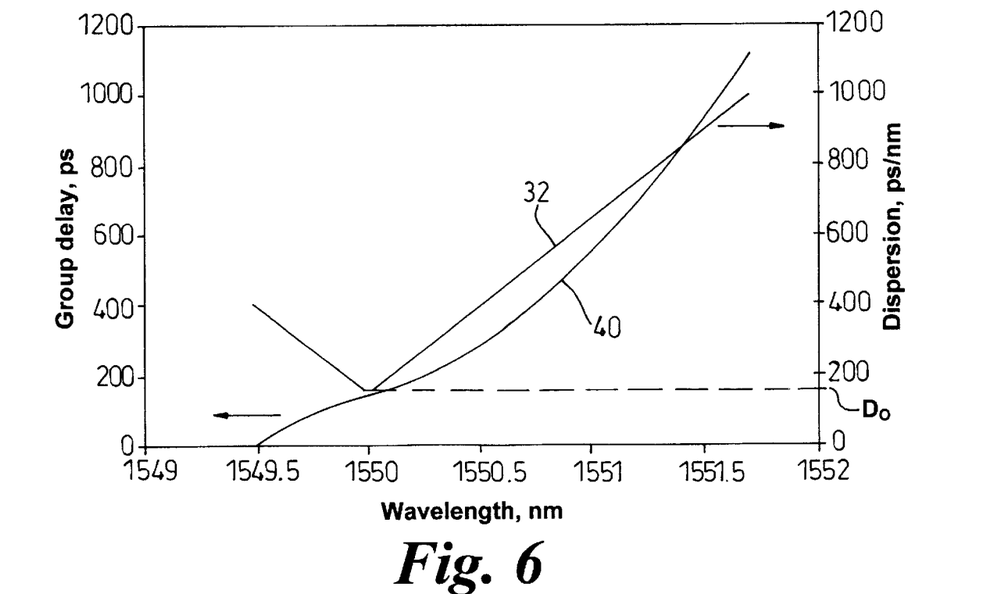
FIG. 6 is a plot of the dispersion and group delay as functions of wavelength for the first embodiment.

The group delay and dispersion characteristics with wavelength, corresponding to the chirp profile in FIG. 5 are shown in FIG. 6. In this way, the $D_0$ value is effectively defined not at the start of the grating, but at the start of the useable portion of the grating. This allows the bandwidth to be increased considerably. However, it is still necessary to have some form of apodisation. If the quadratic chirp were to be continued (as shown by the dotted line in FIG. 5) then the Bragg wavelength would double back on itself and would not be monotonic, i.e. it would be impossible to fabricate. Instead, in the embodiment whose chirp profile is shown in FIG. 5, the quadratic chirp is "reversed" in the second portion to provide a smooth termination to the grating. Equally, a linear ox other function could be used. However, reversing the quadratic variation quickly increases the dispersion, improving the termination.

As can be seen from FIG. 5, the apodisation at the beginning of the grating takes place wholly within the second portion, and strong reflection of incident light is provided at the high chirp end of the first portion, right down to the wavelength so, the wavelength corresponding to the Bragg wavelength at the second end of the first portion, at $Z_0$. In other embodiments it is not essential for the initial apodisation to take place wholly within the second portion, and reflectivity (and hence coupling coefficient) may still be increasing through the interface between the second and first portions. However, it is important that the coupling coefficient at the second end of the first portion is sufficient to give appreciable reflection of incident light at the appropriate Bragg wavelengths.

Figure 7:
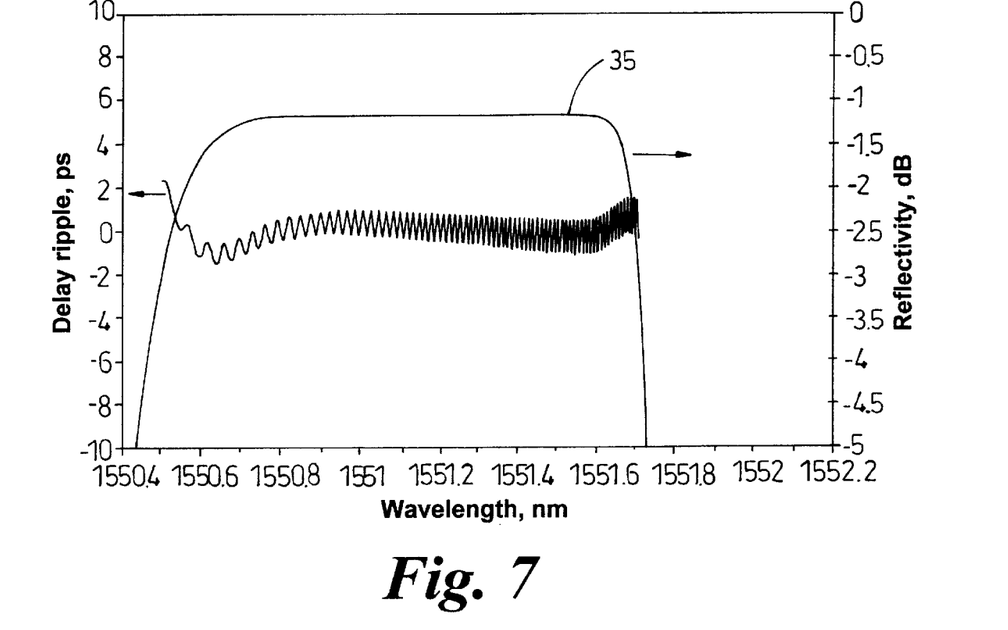
FIG. 7 is a plot of the reflectivity and delay ripple versus wavelength for a conventional quadratically chirped fibre Bragg grating.
Figure 8:
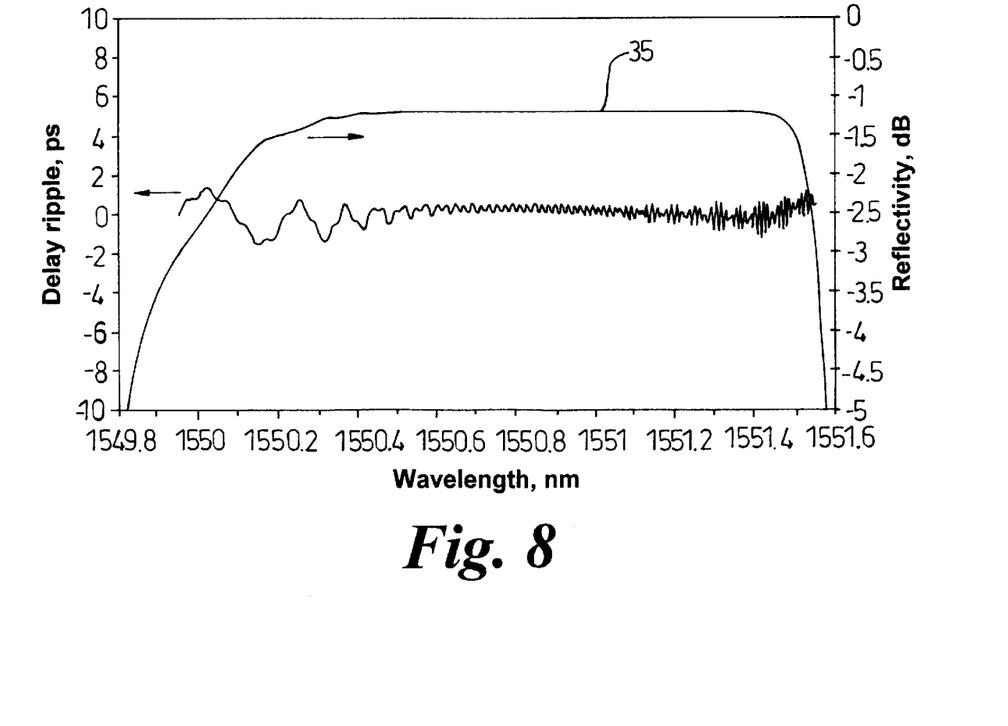
FIG. 8 is a plot of the reflectivity and delay ripple versus wavelength for a fibre Bragg grating in accordance with the first embodiment of the present invention.

Turning now to FIG. 7 this shows the simulated results of a calculation of reflectivity and delay ripple (i.e. deviation of delay from the perfect quadratic) for a conventional quadratically chirped fibre Bragg (grating design with $D_0$ equal to 150 ps/nm and Q=500 ps/nm2. The reflectivity curve 35 has a substantially rectangular form. The 1.5 dB grating bandwidth is approximately 1.1 nm. By comparison, FIG. 8 shows simulated results of calculations for the reversed quadratic design embodying the present invention, with a 1.5 dB bandwidth of approximately 1.5 nm. For a signal bandwidth of 0.6 nm, the conventional design would have a tuning range of 500 ps/nm compared with a tuning range of 900 ps/nm for the inventive reversed-quadratic design. Importantly, the reversed quadratic design involves no penalty in terms of increased delay ripple. Thus, by arranging the apodisation at the start of the grating to take place substantially within or wholly within the second chirped portion, the tuning range achieved with the quadratically chirped grating has been almost doubled. The variation of reflectivity against wavelength for the grating embodying the invention, as shown in FIG. 8, retains a substantially rectangular form.

Figure 10:
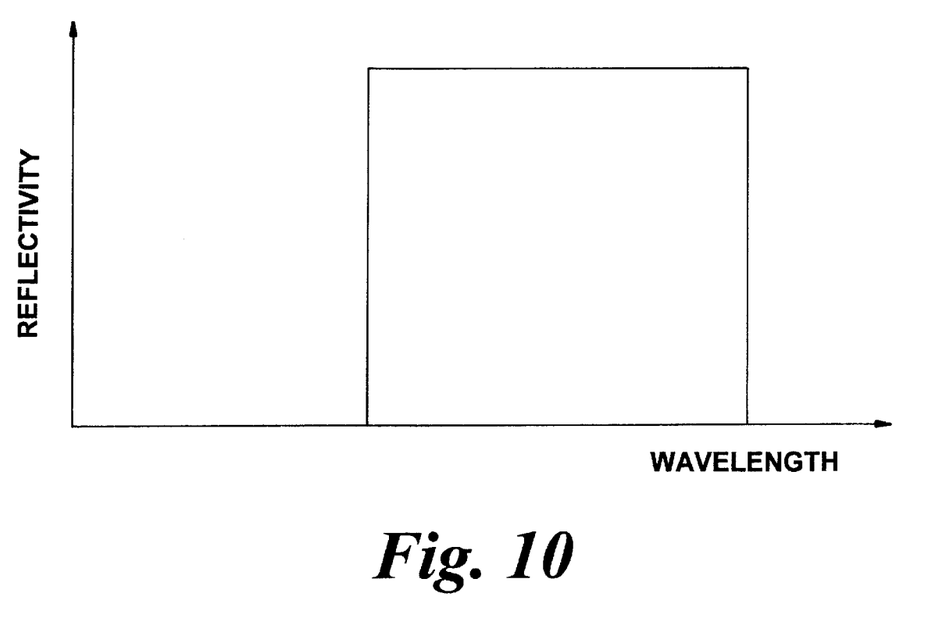
FIG. 10 is a schematic plot of reflectivity versus wavelength for a fibre Bragg grating in accordance with a preferred embodiment in which the second portion of fibre is reversed quadratically chirped.

FIG. 10 shows in highly schematic form the variation of reflectivity with wavelength for a grating embodying the present invention, in which the first and second portions are quadratically chirped, with the apodisation taking place at the first end of the first portion and the second end of the second portion.

Figure 11:
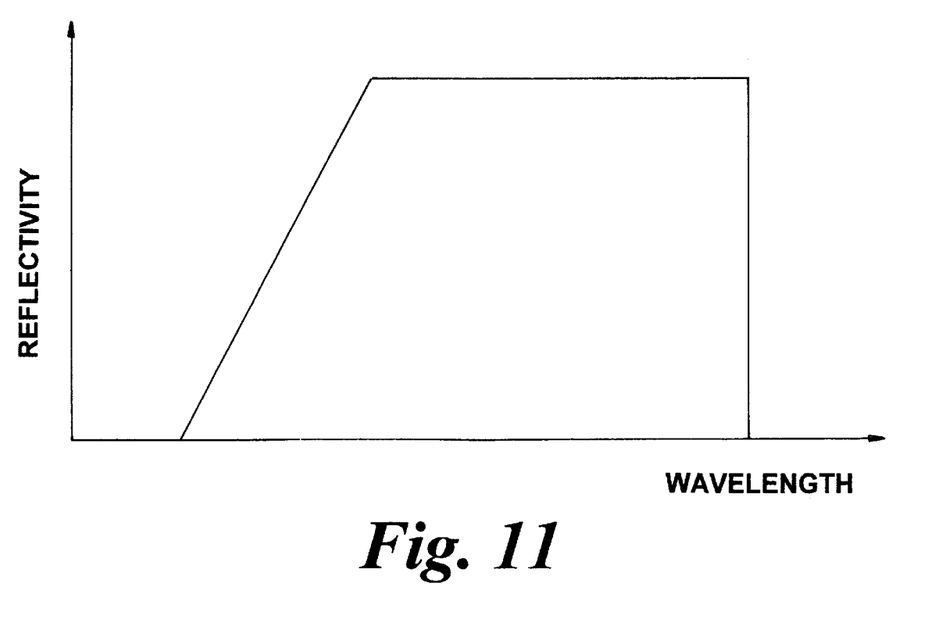
FIG. 11 is a schematic plot of reflectivity versus wavelength for a fibre Bragg grating having the same quadratically chirped first portion as the embodiment whose characteristics are shown in FIG. 10, but having in linearly chirped second portion rather than a quadratically chirped second portion.

FIG. 11 shows the reflectance spectrum that would result if the quadratically chirped apodised second portion of the grating which lead to the spectrum in FIG. 10 were to be replaced with a linearly chirped portion. By apodising in the linear portion, the reflectance bandwidth is able to extend right down to the high chirp end of the first portion, but rather than the reflectivity then dropping abruptly to zero, with the linearly chirped second portion there is a considerable leading slope to the characteristic.

For certain applications, it is desirable to have as near symmetrical a reflectance spectrum with wavelength as possible. For example, one may want to use dithering techniques to centre a reflectance bandwidth or a signal bandwidth or vice versa. Furthermore, it may be desirable to "sample" the first portion of grating to provide a series of reflectance spectra.

In such applications, it is therefore highly desirable to arrange the second portion to possess "reversed" quadratic chirp to provide a reflectivity characteristic more like that shown in FIG. 10. For a sampled grating, providing an apodised reverse quadratic second portion in front of the sampled first portion of grating enables the reflectance spectra for each waveband to have the substantially rectangular form shown in FIG. 10.

Figure 9:
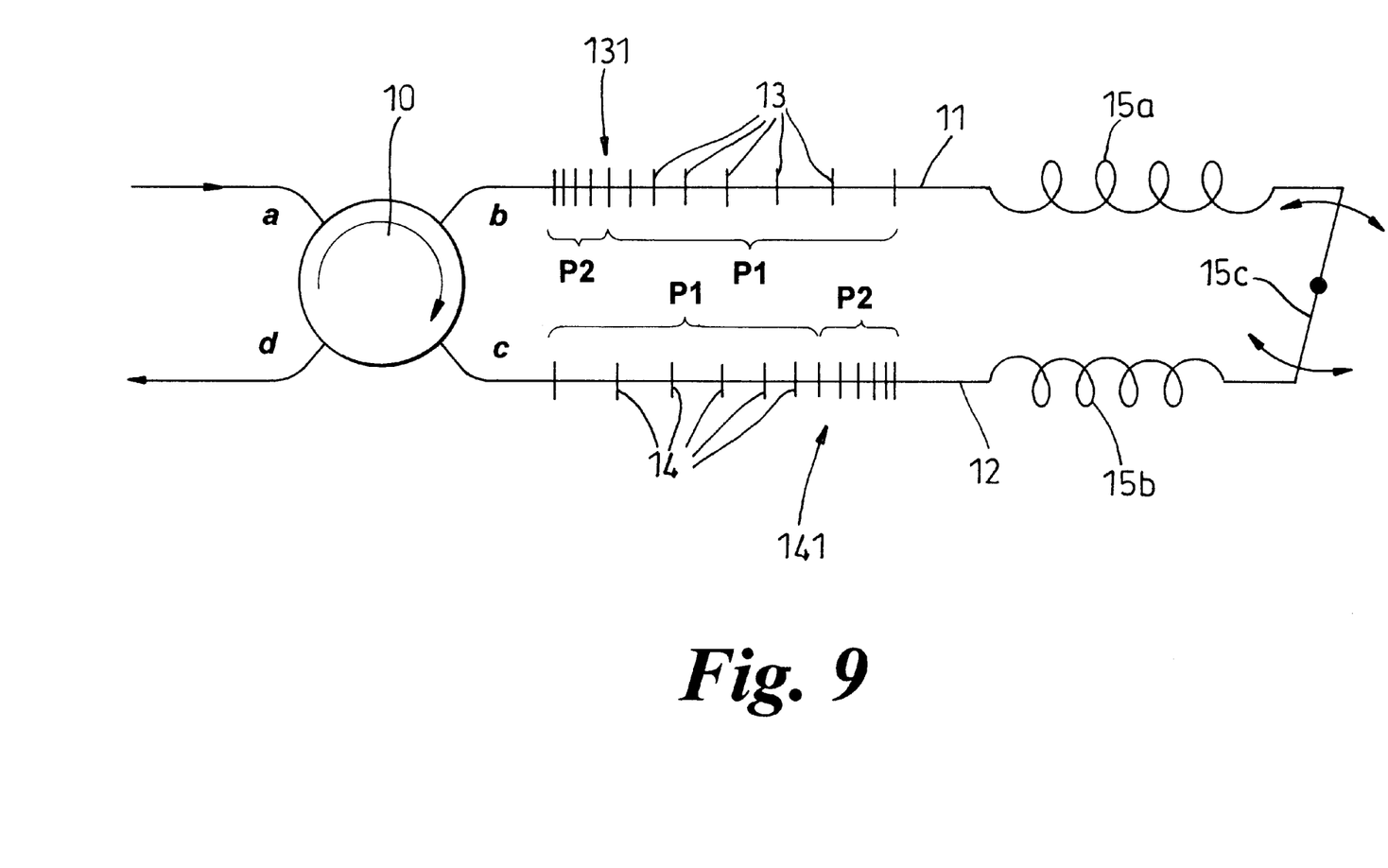
FIG. 9 is a schematic diagram of apparatus for providing adjustable linear dispersion compensation in accordance with a second embodiment.

Moving on to FIG. 9, this shows an adjustable dispersion compensation device which has three principal components: a four-port circulator 10, two optical fibres 11 and 12 provided with respective chirped Bragg reflective gratings 13 and 14, and some form of adjustable differential tensile strain applicator for axially straining the two waveguides 11 and 12 uniformly over the lengths of their respective gratings 13 and 14 (this strain applicator being symbolically represented in this Figure by a pair of helical springs 15a and 15b differentially coupled by means of a pivoted lever 15c). Light that enters the circulator 10 by way of its port 'a' emerges by way of its port 'b', to which fibre 11 with its grating 13 is optically coupled. The light that is reflected by this grating 13 re-enters the circulator by way of port 'b', and re-emerges by way of its port 'c', to which fibre 12 with its grating 14 is optically coupled. The light that is reflected by this grating 14 re-enters the circulator by way of port 'c', and re-emerges by way of its port 'd'.

The combined effect of reflection from the first and second fibre Bragg gratings 131 and 141 is to introduce a dispersion to the light signals incident at 'a', that dispersion being linear over the range of overlap of the reflectance spectra of the two gratings. The first grating 131 is arranged so that it have a second portion P2 at the high chirp end of a first portion P1. The grating 131 is arranged so that light is incident first to the short Bragg wavelength end of the second portion.

In this example, the second Bragg grating 141 is substantially identical to the first grating 131, although it is arranged to have the opposite orientation with regard to incident light signal direction. Thus, light signals from port C of the circulator 10 first encounter the long Bragg wavelength, low chirp end of the first portion P1 of the second grating 141.

As a differential strain is applied to the two gratings by the strain applicator, the degree of overlap of the reflectance spectra of the two gratings is altered as is the linear dispersion in that overlapping region.

Adjustable dispersion compensators are essential components for all optical transmission systems operating at 40 Gbit/s and above. Compensators incorporating fibre Bragg gratings in accordance with the present invention enable a near doubling of tuning range to be achieved, which allows a considerable loosening of the tolerances on matching the dispersions in the system. There is a continuing need to increase signal bandwidths, and it is therefore desirable to continue to increase the tuning ranges of dispersion compensation devices.

Figure 12:
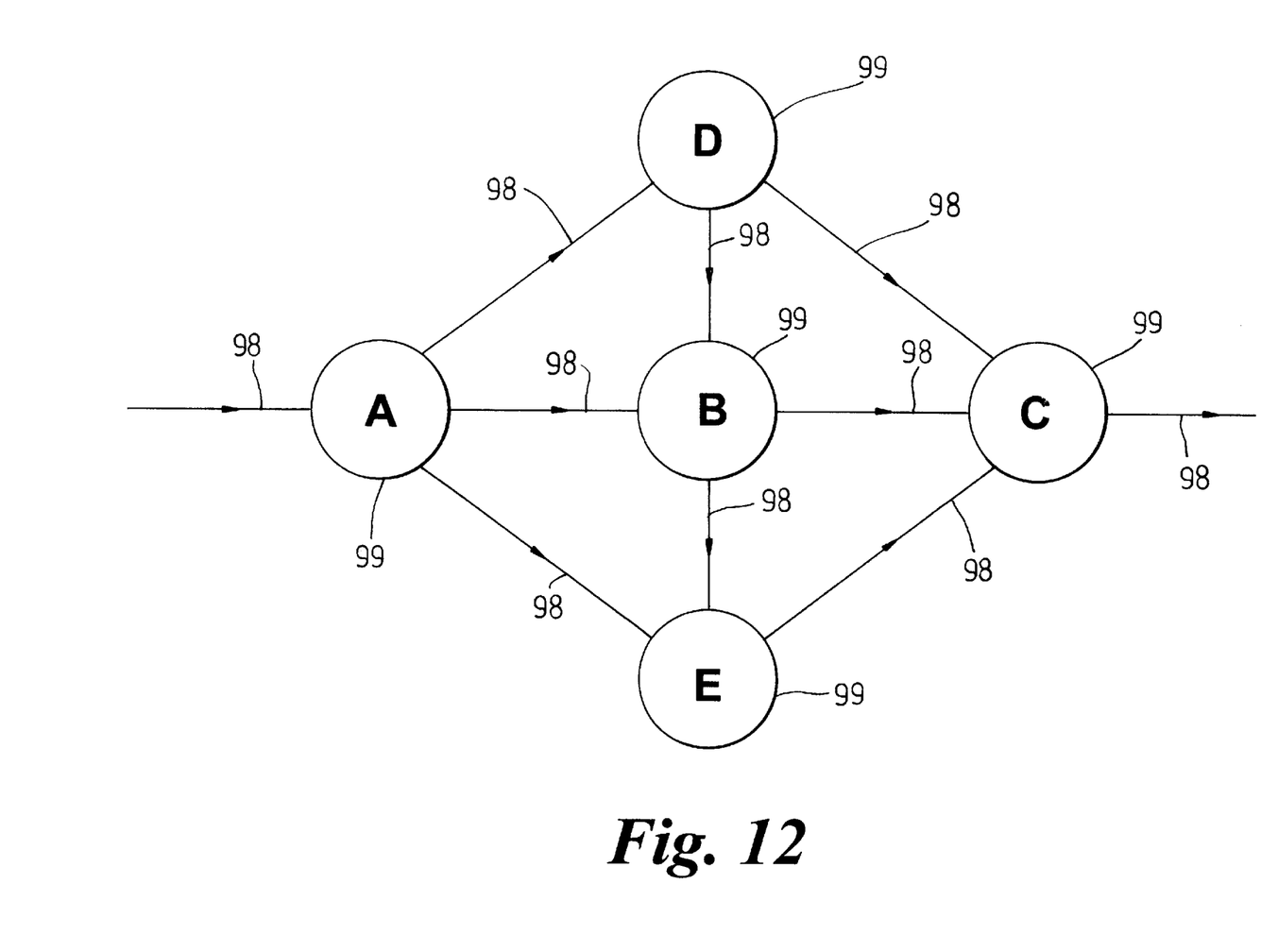
FIG. 12 is a highly schematic diagram of a Network incorporating nodes in accordance with an aspect of the invention.

Turning now to FIG. 12, this shows in highly schematic form part of an optical transmission network comprising a plurality of nodes 99 connected by optical transmission fibres 98. Each node 99 includes adjustable dispersion compensation apparatus for compensating for dispersion in the signals they receive from the other nodes. These pieces of adjustable dispersion compensation apparatus may comprise fibre Bragg gratings in accordance with any of the embodiments of the present invention as described above.

Consider the following situation. A signal is first transmitted from node A to node C via node B, defining a first optical transmission path along the two cobbles connecting A and B and B and C respectively. The cable connecting A and B then breaks, necessitating a re-routing of the signal in order to reach node C as desired. The system controller can arrange to re-route the signal via node D or via E, and these two options involve the use of different optical transmission cables compared with the two cables used initially. Even if the different cables 98 each have the same length, their intrinsic properties will vary to some degree, and hence the dispersion they introduce to signals conveyed along them will be different. The dispersion compensation apparatus in node C is arranged to provide a range of tuning which can accommodate the changes in dispersion in the signal it receives from either the route via D or the route via E. Furthermore, temperature fluctuations/variations of the apparatus, and cables in particular, will also affect the dispersion imparted to the signals. By incorporating the described inventive fibre Bragg gratings, the nodes are able to provide a range of adjustable dispersion tuning to accommodate for the temperature fluctuations encountered in practice.

By incorporating the inventive gratings in the network nodes 99, an increased degree of re-routing around the network may be tolerated without compromising signal transmission performance, thus providing for a more flexible network.

What is claimed is:

1. A Bragg grating reflector comprising;
   a quadratically chirped first portion having a high chirp end and a low chirp end; and
   a differently chirped second portion arranged in series with the first portion,
   the second portion having a first end proximate the high chirp end of the first portion, and a second end,
   wherein the high chirp end of the first portion is not apodised, and the chirped second portion is apodised to at least reduce delay ripple for light signals in a bandwidth reflected by the grating.

2. A Bragg grating reflector having a length, and an effective pitch and a coupling coefficient which are each dependent on position along the length, the grating comprising first and second chirped portions arranged in series with each other along the length and each having respective first and second ends, the second end of the first portion being proximate the first end of the second portion,
   the effective grating pitch in the first portion being a substantially quadratic function of position and progressively increasing or decreasing from the first to the second end, and the modulus of the rate of change of effective grating pitch with position in the first portion being a maximum at the second end,
   wherein the effective grating pitch in the second portion is a different function of position and continues to progressively increase or decrease, respectively, from the first end to the second end,
   the coupling coefficient at the second end of the first portion of grating is arranged to provide substantial reflectivity to incident light of the appropriate Bragg wavelengths,
   and the coupling coefficient in the second portion of grating is arranged to exhibit a reflectivity to incident light of the appropriate Bragg wavelengths which decreases from a substantial value at the first end to substantially zero at the second end.

3. A Bragg grating reflector in accordance with claim 1 wherein the chirp of the second portion does not exceed the chirp at the high chirp end of the first portion.

4. A Bragg grating reflector in accordance with claim 1 wherein the chirp at the first end of the second portion is equal to the chirp at the high chirp end of the first portion.

5. A Bragg grating reflector in accordance with claim 1 wherein the first end of the second portion is immediately adjacent the high chirp end of the first portion.

6. A Bragg grating reflector in accordance with claim 1 wherein the second portion is quadratically chirped such that the chirp at its first end is higher than the chirp at the second end.

7. A Bragg grating reflector in accordance with claim 6, wherein the first portion of grating is sampled to provide reflection in a plurality of wavelength bands.

8. A Bragg grating reflector in accordance with claim 1 wherein the second portion is linearly chirped such that the chirp at its first end is equal to the chirp at its second end.

9. A Bragg grating reflector in accordance with claim 1, wherein the first portion of grating is sampled to provide reflection in a plurality of wavelength bands.

10. Apparatus for providing dispersion to light signals, the apparatus comprising a Bragg grating reflector in accordance with claim 1 and an optical waveguide arranged to convey the light signals to the grating for reflection, and an optical waveguide arranged to convey the reflected light signals away from the grating.

11. Optical signal transmission apparatus comprising a plurality of repeater units for connecting a plurality of lengths of signal conveying optical fibre, each repeater unit including apparatus in accordance with claim 10 for compensating for dispersion in the signals received from the preceding length of fibre.

12. Apparatus for providing adjustable dispersion to light signals, the apparatus comprising a Bragg grating reflector in accordance with claim 1 and an optical waveguide arranged to convey the light signals to the grating for reflection, and an optical waveguide arranged to convey the reflected light signals away from the grating, the apparatus further comprising adjustable strain apparatus arranged to apply adjustable tensile strain to the Bragg grating reflector.

13. Apparatus in accordance with claim 12 and exhibiting linear optical dispersion of adjustable magnitude, which apparatus includes first and second optical fibre waveguides provided with respective first and second chirped fibre Bragg gratings, each in accordance with claim 1, which gratings exhibit, in the absence of strain, quadratic chirp of substantially matched modulus, and which gratings are arranged to define an optical transmission path that includes sequential reflection in both gratings with a relative orientation to provide quadratic chirp of opposite sign, which device maintains each fibre waveguide, over the length of its Bragg grating, in substantially uniform tensile strain, and includes a differential mode strain adjuster operative to adjust the magnitude of the dispersion exhibited by the device by reducing the tensile strain in one of said first and second gratings while increasing, by a substantially equivalent amount, the tensile strain in the other of said gratings.

14. Apparatus in accordance with claim 12 and exhibiting linear optical dispersion of adjustable magnitude, which apparatus includes first and second optical fibre waveguides provided with respective first and second chirped fibre Bragg gratings, each in accordance with claim 2, which gratings exhibit, in the absence of strain, quadratic chirp of substantially matched modulus, and which gratings are arranged to define an optical transmission path that includes sequential reflection in both gratings with a relative orientation to provide quadratic chirp of opposite sign, which device maintains each fibre waveguide, over the length of its Bragg grating, in substantially uniform tensile strain, and includes a differential mode strain adjuster operative to adjust the magnitude of the dispersion exhibited by the device by reducing the tensile strain in one of said first and second gratings while increasing, by a substantially equivalent amount, the tensile strain in the other of said gratings.

15. Optical signal transmission apparats comprising a plurality of repeater units for connecting a plurality of lengths of signal conveying optical fibre, each repeater unit including apparatus in accordance with claim 12 for providing adjustable compensation for dispersion in the signals received from the preceding length of fibre.

16. A node for an optical signal transmission system, the node including apparatus in accordance with claim 12 for providing adjustable compensation for dispersion in signals received by the node.

17. A Bragg grating reflector in accordance with claim 1, in which the magnitude of the chirp in the second portion is always less than the maximum magnitude of chirp which would arise in the second portion if the quadratic chirp of the first portion were continued in the second portion.

18. A Bragg grating reflector in accordance with claim 1, wherein the magnitude of the chirp in the second portion is, at each position along the length of the second portion, less than the magnitude of the corresponding chirp which would result at that position if the quadratic chirp of the first portion were continued in the second portion.

19. A Bragg grating reflector in accordance with claim 1, wherein the quadratic chirp of the first portion is such that, if it were continued in the second portion, its magnitude would reach infinity in the second portion.

20. A Bragg grating reflector in accordance with claim 1, wherein the quadratic chirp of the first portion is such that, if it were continued in the second portion, it would change sign in the second portion.

21. A Bragg grating reflector in accordance with claim 2, wherein the modulus of the rate of change of effective grating pitch with position in the second portion is a maximum at the first end, and the maximum at the first end of the second region is less than or equal to the maximum at the second end of the first region.

22. A Bragg grating reflector in accordance with claim 2, wherein the effective pitch at the second end of the first portion is substantially equal to the effective pitch at the first end of the second portion.

23. A Bragg grating reflector in accordance with claim 2, wherein the second end of the first portion is immediately adjacent the first end of the second portion.

24. A Bragg grating reflector in accordance with claim 23, wherein the effective grating pitch is a continuous function of position from the first end of the first portion to the second end of the second portion.

25. A Bragg grating reflector in accordance with claim 2, wherein the grating is apodised at the first end of the first region and at the second end of the second portion.

26. A Bragg grating reflector in accordance with claim 2, wherein the effective grating pitch in the first portion is not an exact quadratic function of position, but varies with position in a manner selected such that the first portion presents a delay to incident light of the appropriate wavelengths, the delay being a quadratic function of wavelength.

27. A Bragg grating reflector in accordance with claim 2 wherein the effective grating pitch in the second portion is a substantially quadratic function of position.

28. A Bragg grating reflector in accordance with claim 27, wherein the effective grating pitch and the rate of change of effective grating pitch with position at the second end of the first portion are substantially the same as the effective grating pitch and rate of change of effective grating pitch with position respectively at the first end of the second portion.

29. A Bragg grating reflector in accordance with claim 27, wherein the first portion of grating is sampled to provide reflection in a plurality of wavelength bands.

30. A Bragg grating reflector in accordance with claim 2, wherein the first and second portions are each substantially quadratically chirped, the quadratic chirp of the second portion being substantially a reverse of the quadratic chirp of the first portion.

31. A Bragg grating reflector in accordance with claim 2, wherein the second portion is linearly chirped.

32. A Bragg grating reflector in accordance with claim 2, wherein the first portion of grating is sampled to provide reflection in a plurality of wavelength bands.

33. Apparatus for providing dispersion to light signals, the apparatus comprising a Bragg grating reflector in accordance with claim 2 and an optical waveguide arranged to convey the light signals to the grating for reflection, and an optical waveguide arranged to convey the reflected light signals away from the grating.

34. Optical signal transmission apparatus comprising a plurality of repeater units for connecting a plurality of lengths of signal conveying optical fibre, each repeater unit including apparatus in accordance with claim 33 for compensating for dispersion in the signals received from the preceding length of fibre.

35. Apparatus for providing adjustable dispersion to light signals, the apparatus comprising a Bragg grating reflector in accordance with claim 2 and an optical waveguide arranged to convey the light signals to the grating for reflection, and an optical waveguide arranged to convey the reflected light signals away from the grating, the apparatus further comprising adjustable strain apparatus arranged to apply adjustable tensile strain to the Bragg grating reflector in a direction along its length to adjustably vary the effective pitch.

36. Optical signal transmission apparatus comprising a plurality of repeater units for connecting a plurality of lengths of signal conveying optical fibre, each repeater unit including apparatus in accordance with claim 35 for providing adjustable compensation for dispersion in the signals received from the preceding length of fibre.

37. A node for an optical signal transmission system, the node including apparatus in accordance with claim 35 for providing adjustable compensation for dispersion in signals received by the node.

38. Optical signal reflection apparatus comprising:

a quadratically chirped Bragg grating reflector having a high chirp end and a low chirp end, the high chirp end not being apodised; and a delay ripple reducing module arranged in series with the grating, proximate the high chirp end, and adapted to at least reduce delay ripple for optical signals in a bandwidth reflected by the grating.

39. Apparatus for providing dispersion to light signals, the apparatus comprising optical signal reflection apparatus in accordance with claim 38.

40. Apparatus for providing adjustable dispersion to light signals, the apparatus comprising optical signal reflection apparatus in accordance with claim 38; and means for adjusting the effective pitch of the grating along its length.

41. A node for an optical transmission system, the node including apparatus in accordance with claim 40 for providing adjustable compensation for dispersion in signals received by the node.

42. A Bragg grating reflector providing a reflection spectrum with a wavelength which consists of a region A, in which the reflectivity changes from substantially zero to substantially maximum reflectivity; a region B adjacent to region A, in which reflectivity is always substantially maximum; and a region C, adjacent to region B, in which the reflectivity changes from substantially maximum reflectivity to substantially zero reflectivity, wherein region B provides a group delay that is substantially quadratic function of wavelength, the low dispersion end of region B being proximate region A, and at least one of regions A and C provides, over a substantial proportion of that region, a group delay which is a different function of wavelength.

43. A Bragg grating reflector in accordance with claim 42, in which the magnitude of the dispersion, being the gradient of group delay with wavelength, in region A is always greater than the minimum magnitude of dispersion in region A that would result if the quadratic group delay of region B were continued in region A.

44. A Bragg grating reflector in accordance with claim 42 in which the magnitude of dispersion, being the gradient of group delay with wavelength, at each wavelength in region A is greater than the corresponding magnitude of the dispersion at that wavelength that would result if the quadratic group delay of region B were continued in region A.

45. A Bragg grating reflector in accordance with claim 42, wherein the quadratic group delay of region B is such that, if it were continued in region A, its gradient, and hence the magnitude of dispersion, would reach zero in region A.

46. A Bragg grating reflector in accordance with claim 42, wherein the quadratic group delay of region B is such that, if it were continued in region A, its gradient, and hence dispersion, would change sign in region A.

* * * * *